United States Patent
Clarke et al.

(10) Patent No.: US 7,728,949 B2
(45) Date of Patent: Jun. 1, 2010

(54) ELECTRO-ACTIVE LENS

(75) Inventors: Roger Clarke, Cambridge (GB); Allan Carmichael, Orwell (GB); Joshua N. Haddock, Roanoke, VA (US); William Kokonaski, Gig Harbor, WA (US)

(73) Assignee: PixelOptics, Inc., Roanoke, VA (US)

( * ) Notice: Subject to any disclaimer, the term of this patent is extended or adjusted under 35 U.S.C. 154(b) by 200 days.

(21) Appl. No.: 12/018,048

(22) Filed: Jan. 22, 2008

(65) Prior Publication Data

US 2008/0180630 A1 Jul. 31, 2008

Related U.S. Application Data

(60) Provisional application No. 60/881,516, filed on Jan. 22, 2007.

(51) Int. Cl.
  *G02F 1/13* (2006.01)
  *C09K 19/02* (2006.01)
(52) U.S. Cl. .................. 349/201; 349/200; 349/175
(58) Field of Classification Search .......... 349/201, 349/200, 175
  See application file for complete search history.

(56) References Cited

U.S. PATENT DOCUMENTS

| | | | |
|---|---|---|---|
| 6,491,391 B1 * | 12/2002 | Blum et al. ........... | 351/159 |
| 7,009,757 B2 * | 3/2006 | Nishioka et al. ....... | 359/319 |
| 2004/0056986 A1 | 3/2004 | Blum et al. | |
| 2005/0073739 A1 | 4/2005 | Meredith et al. | |
| 2006/0164593 A1 | 7/2006 | Peyghambarian et al. | |
| 2007/0159562 A1 * | 7/2007 | Haddock et al. ........ | 349/13 |
| 2007/0280626 A1 * | 12/2007 | Haddock et al. ........ | 385/147 |

OTHER PUBLICATIONS

International Search Report of Application No. PCT/US08/51709 mailed on Jul. 14, 2008.

Supplementary European Search Report corresponding to the European application No. 08728084, dated Feb. 16, 2010.

* cited by examiner

*Primary Examiner*—Mike Qi
(74) *Attorney, Agent, or Firm*—Townsend and Townsend and Crew LLP

(57) ABSTRACT

Embodiments of the present invention relate to a cholesteric liquid crystalline material which may be usable in an electro-active element for providing fail safe operation, polarization insensitivity, low electrical power consumption requirements, and a small number of electrical connections. The cholesteric liquid crystalline material may be usable in an electro-active element for providing a diffractive efficiency or focusing efficiency above 90% in an activated state of the electro-active element and a diffractive efficiency or focusing efficiency below 10% in a deactivated state of the electro-active element.

51 Claims, 5 Drawing Sheets

ELECTRO-ACTIVE LENS

CROSS REFERENCE TO RELATED APPLICATIONS

This application claims priority from and incorporates by reference in their entirety the following provisional application:

U.S. Ser. No. 60/881,516 filed on 22 Jan. 2007 and entitled "Polarization insensitive electro-active diffractive lens comprising a cholesteric liquid crystalline material that exhibits substantially no optical power in the off-state".

BACKGROUND OF THE INVENTION

1. Field of the Invention

The present invention relates to a cholesteric liquid crystalline material. More specifically, the present invention relates to a cholesteric liquid crystalline material usable in an electro-active element or electro-active lens for providing an optical power in an activated state of the electro-active element or electro-active lens and substantially no optical power in a deactivated state of the electro-active element or electro-active lens.

2. Description of the Related Art

An electro-active element is a device with an optical power that is alterable with the application of electrical energy. An electro-active element may be constructed from two substrates. An electro-active material may be disposed between the two substrates. The substrates may be shaped and sized to ensure that the electro-active material is contained within the substrates and cannot leak out. One or more electrodes may be disposed on each surface of the substrates that is in contact with the electro-active material. The electro-active element may include a controller to apply one or more voltages to each of the electrodes. The electro-active element may include a power supply operably connected to the controller. When electrical energy is applied to the electro-active material by means of the electrodes, the electro-active material's index of refraction may be altered thereby changing an optical property of the electro-active element, such as its focal length or diffraction efficiency, for example.

An electro-active element may be in optical communication with a base lens. The electro-active element may be embedded within or attached to a surface of the base lens to form an electro-active lens. A base lens may be an optical substrate or a conventional optical lens. The optical substrate may be a lens blank. A lens blank is a device made of optical material that may be shaped into a lens. A lens blank may be "finished", meaning that the lens blank has both of its external surfaces shaped into refractive external surfaces. A finished lens blank has an optical power which may be any optical power including zero or plano optical power. A lens blank may be "semi-finished", meaning that the lens blank has been shaped to have only one finished refractive external surface. A lens blank may be "unfinished", meaning that neither external surface of the lens blank has been shaped into a refractive surface. An unfinished surface of an unfinished or semi-finished lens blank may be finished by means of a fabrication process known as free-forming or by more traditional surfacing and polishing. A finished lens blank has not had its peripheral edge shaped, edged, or modified to fit into an eyeglass frame.

An electro-active element may also be embedded within or attached to a surface of a conventional optical lens to form an electro-active lens. A conventional optical lens is any device or portion of a device that causes light to converge or diverge. A lens may be refractive or diffractive. A lens may be either concave, convex, or planar on one or both surfaces. A lens may be spherical, cylindrical, prismatic, or a combination thereof. A lens may be made of optical glass, plastic, thermoplastic resins, thermoset resins, a composite of glass and resin, or a composite of different optical grade resins or plastics. A lens may be referred to as an optical element, optical preform, optical wafer, finished lens blank, or optic. It should be pointed out that within the optical industry a device can be referred to as a lens even if it has zero optical power (known as plano or no optical power). The conventional optical lens may be a single focus lens or a multifocal lens such as a Progressive Addition Lens or a bifocal or trifocal lens.

The electro-active element may be located in the entire viewing area of the electro-active lens or in just a portion thereof. The electro-active element may be spaced from the peripheral edge of the optical substrate or conventional optical lens in order to allow the electro-active lens to be edged for spectacle frames. The electro-active element may be located near the top, middle or bottom portion of the lens. It should be noted that the electro-active element may be capable of focusing light on its own and does not need to be combined with an optical substrate or conventional optical lens.

An electro-active element may be capable of switching between a first optical power and a second optical power. The electro-active element may have the first optical power in a deactivated state and may have the second optical power in an activated state. The electro-active element may be in a deactivated state when one or more voltages applied to the electrodes of the electro-active element are below a first predetermined threshold. The electro-active element may be in an activated state when one or more voltages applied to the electrodes of the electro-active element are above a second predetermined threshold. Alternatively, the electro-active element may be capable of "tuning" its optical power such that the electro-active element is capable of providing a continuous, or substantially continuous, optical power change between the first optical power and the second optical power. In such an embodiment, the electro-active element may have the first optical power in a deactivated state and may have an optical power between a third optical power and the second optical power in an activated state, wherein the third optical power is above the first optical power by a predetermined amount.

Electro-active lenses may be used to correct for conventional or non-conventional errors of the eye. The correction may be created by the electro-active element, by the optical substrate or the conventional optical lens, or by a combination of the two. Conventional errors of the eye include lower order aberrations such as myopia, hyperopia, presbyopia, and astigmatism. Non-conventional errors of the eye include higher order aberrations that can be caused by ocular layer irregularities.

An electro-active element may include a liquid crystal. Liquid crystal is particularly well suited for electro-active lenses because it has an index of refraction that can be altered by generating an electric field across the liquid crystal. Lastly, the operating voltage of some commercially available liquid crystals for display applications is typically less than 5 volts. Furthermore, some liquid crystals possess bulk resistivities on the order of $10^{11}$ Ωcm or more, which reduces electrical power consumption.

The development of electro-active lens technology for ophthalmic applications places certain requirements on the technology that are critical to its success. One such requirement is that in the case of failure, the user of the electro-active lens must not be placed in a dangerous situation. Such a requirement is known as fail-safe operation. For example, a user may have electro-active spectacle lenses designed for the correction of presbyopia. Presbyopia is the loss of accommodation of the crystalline lens of the human eye that accompanies aging. This loss of accommodation first results in an inability to focus on near distance objects and later results in an inability to focus on intermediate distance objects. In the user's electro-active spectacle lenses, a conventional optic may correct for the user's far distance refractive error, if any. An electro-active element, when activated, may provide additional optical power to correct for the user's near and/or intermediate distance refractive error. When the user engages in far distance tasks such as driving, the electro-active element is deactivated thereby providing the user with proper far distance correction. When the user engages in near or intermediate distance tasks such as reading a book or looking at a computer screen, the electro-active lens is activated thereby providing the user with proper near distance correction. If the power source or the controller of the electro-active spectacle lenses should fail while the user is driving a car, it is vitally important that the electro-active element be capable of defaulting to a deactivated state so that the user is provided with proper far distance correction.

A second requirement for electro-active lens technology is that the electro-active lens must be insensitive to the polarization of the light it is meant to focus. Light is a transverse wave composed of electromagnetic field vectors which oscillate perpendicular to the light wave's direction of propagation. The path that a given field vector traces out in time (in most of optics only the electric field vector is considered) can be thought of as the polarization state (linear polarization for a linear path, circular for a circular path, etc.). The light emitted from most illumination sources (e.g. the sun, incandescent and fluorescent lamps) can be described as unpolarized or randomly polarized in which the direction of the electric field vector oscillates randomly with time. Despite the random oscillations of the electric field vector, at any given instant, the electric field vector can be broken into two orthogonal vector components, as can be done for perfectly polarized light. As is well known in the art, these vector components, by way of example only, may themselves be linearly polarized and orthogonal in a Cartesian sense, or circularly polarized, and orthogonal in that they propagate with right and left handed twists. In other instances, the electric field vector may be broken down into two orthogonal components which are elliptically polarized (of which circularly polarized is a unique form).

An effective electro-active lens technology must be insensitive to the polarization of light, i.e. it must be able to focus light having any polarization state. However, most liquid crystalline materials are birefringent (exhibit an anisotropy of the refractive index) and as such are highly polarization sensitive. Optical waves with different polarization states traveling through a birefringent medium may experience a different index of refraction depending upon their direction of travel. For liquid crystal display applications the issue of polarization sensitivity is addressed through the use of dichroic polarizing films to only allow linearly polarized light to enter the display. As mentioned above, randomly polarized light waves have an electric field vector which oscillates randomly with time. Malus' law states that the intensity of a light wave passing through a linear polarizer is proportional to $\cos^2(\theta)$, where $\theta$ is the angle between the light wave's polarization direction (the electric field vector's direction) and the linear polarizer's direction. Since the incoming light wave is randomly polarized, it contains all $\theta$'s at random. Therefore, the intensity of the light wave passing through the linear polarizer is the average of $\cos^2(\theta)$, which is 50%. Thus, using a polarizing film blocks 50% of randomly polarized incoming light making it an unattractive option for electro-active lenses since it is important to focus all incoming light.

Polarization sensitivity is addressed differently depending, in a large part, on the optical properties of the particular liquid crystal being utilized. A nematic liquid crystal is optically uniaxial and possesses a single axis of symmetry with respect to its optical properties. This axis is known as the "director". The orientation of the director varies throughout the bulk of a nematic liquid crystal layer but through the use of alignment layers, can be made, on average, to point in a single direction, called the alignment direction. An alignment layer is a thin film, which, by way of example only, may be less than 100 nanometers thick and constructed from a polyimide material. The thin film is applied to the surface of substrates that comes into direct contact with liquid crystal. Prior to assembly of the electro-active element, the thin film is buffed in one direction (the alignment direction) with a cloth such as velvet. When the liquid crystal molecules come in contact with the buffed polyimide layer, the liquid crystal molecules preferentially lie in the plane of the substrate and are aligned in the direction in which the polyimide layer was rubbed (i.e., parallel to the surface of the substrate). Alternatively, the alignment layer may be constructed of a photosensitive material, which when exposed to linearly polarized UV light, yields the same result as when a buffed alignment layer is used. Thus, in the absence of an electric field, the director of the liquid crystal molecules points in the same direction as the alignment direction. In the presence of an electric field, the liquid crystal molecules orient in the direction of the electric field. In an electro-active element, the electric field is perpendicular to the alignment layer. Thus, if the electric field is strong enough, the director of the liquid crystal molecules will be perpendicular to the alignment direction. If the electric field is not strong enough, the director of the liquid crystal molecules will point in a direction somewhere between the alignment direction and perpendicular to the alignment direction.

Uniaxial optical materials possess two unique refractive indices, an ordinary refractive index ($n_o$) and an extra-ordinary refractive index ($n_e$). The birefringence of the uniaxial optical material, $\Delta n$, is defined as $\Delta n = n_e - n_o$. An optical wave traveling in a direction parallel to the liquid crystal's director will experience the ordinary refractive index ($n_o$) regardless of the optical wave's state of polarization as an optical wave is a transverse wave where the electric field (the portion of the wave that experiences the phase delay due to the index of refraction) oscillates in a direction perpendicular to the direction of propagation, as is well known in the art. However, an optical wave traveling along any other path will experience a refractive index between the values of $n_o$ and $n_e$; the exact value of the refractive index depends upon the optical wave's state of polarization and its path through the material. As mentioned above, if the uniaxial material is in contact with an alignment layer and no electric field is applied, the director of the uniaxial material will be in the same direction as the alignment direction. Therefore, an incoming light wave, which is traveling in an direction perpendicular to the layer of uniaxial material (and as such is polarized parallel to the director), will experience an index of refraction between the values of $n_o$ and $n_e$, depending on the polarization state of the incoming light wave. As the electric field is increased, the director of the material begins to point in a direction somewhere between the alignment direction and perpendicular to the alignment direction. An incoming light wave, which is traveling in a direction perpendicular to the layer of uniaxial material, is no longer polarized parallel to the material's director but is not perpendicular to the director either. Therefore, this light wave will also experience a differing index of refraction depending on its polarization state. If the electric field is strong enough, the director of the liquid crystal molecules will be perpendicular to the alignment direction. In this case, incoming light waves will be traveling in a direction parallel to the director and the applied electric field and the incoming light waves will be polarized in a direction perpendicular to the director and the applied electric field. In this scenario, light waves will experience the ordinary index of refraction ($n_o$) regardless of its polarization state.

An important feature for an electro-active lens is the ability to change the focusing power of the lens. Changing the focusing power of the lens is accomplished by altering the index of refraction of the electro-active element's electro-active material. However, changing the index of refraction of a uniaxial material to an intended index of refraction between $n_o$ and $n_e$ is polarization sensitive. As mentioned above, all unpolarized light waves can be thought of as being linearly polarized, where the direction of polarization changes randomly in time. Thus, for the same reason that only 50% of randomly polarized light passes through a linear polarizer, only 50% of the incoming randomly polarized light will experience the intended index of refraction. Therefore, if an electro-active lens that operates in the presence of unpolarized ambient light is constructed from a single layer of nematic liquid crystal, it will only focus half of the incident light. This will result in a drastic and unacceptable drop in visual acuity for the wearer.

A polarization insensitive electro-active lens using nematic liquid crystal that focuses all incident light typically requires the use of two layers of liquid crystal, placed in series, and arranged such that the alignment directions of the layers are orthogonal to each other. As polarized light can be broken down into two orthogonal components, the orthogonal orientation of the alignment directions ensures that the orthogonal components of light of any polarization will be properly focused by either the first layer of liquid crystal or by the second layer of liquid crystal. The drawback to this approach is that the requirements for manufacturing and operating the lens (e.g., materials, electrical connections, and electrical power consumption) will be effectively doubled.

A third requirement for electro-active lens technology is that the electrical power consumption must be as small as possible. As mentioned above, using two layers of nematic liquid crystal is not an attractive option since the power requirements effectively double. Similarly, a single layer of polarization insensitive polymer dispersed liquid crystal, as described by Nishioka, et al. in U.S. Pat. No. 7,009,757, is undesirable since the operating voltages are prohibitive for spectacle lens applications.

A fourth requirement for electro-active lens technology is that the number of electrical connections per lens must be kept at a minimum. Ideally the number of electrical connections should be limited to two: one to provide a zero-voltage reference (commonly referred to as "ground") and another to provide a zero-DC bias time varying voltage (i.e., the time averaged voltage is zero, such that there is no DC offset). While this is achievable with a single layer of polarization insensitive polymer dispersed liquid crystal, the voltages required for the operation of this liquid crystal prohibit the use of the technology in spectacle lenses.

Thus, there is a need for an electro-active lens technology which meets all four of the aforementioned requirements.

SUMMARY OF THE INVENTION

In an embodiment of the present invention an electro-active lens may include a single layer of an electro-active material, wherein the electro-active lens has an optical power in an activated state, and wherein the electro-active lens has substantially no optical power in a deactivated state.

In an embodiment of the present invention a cholesteric liquid crystalline material may include a nematic liquid crystal having a birefringence of approximately 0.20 or higher. The cholesteric liquid crystalline material may further include a chiral doping agent having a helical twisting power with a magnitude of approximately 1.1 or higher.

In an embodiment of the present invention an electro-active element may include a first substrate having an index of refraction and a first dispersion of the index of refraction. The electro-active element may further include a second substrate having the index of refraction and the first dispersion of the index of refraction. The electro-active element may further include a cholesteric liquid crystalline material disposed between the first and said second substrates, wherein the cholesteric liquid crystalline material has an average index of refraction approximately equal to the index of refraction and a second dispersion of the average index of refraction approximately equal to the first dispersion of the index of refraction. The electro-active element may further include a continuous electrode disposed on the side of the first substrate facing the cholesteric liquid crystalline material. The electro-active element may further include one or more electrodes disposed on the side of the second substrate facing the cholesteric liquid crystalline material.

In an embodiment of the present invention, an electro-active lens may include a base lens. The electro-active lens may further include an electro-active element may include a first substrate having an index of refraction and a first dispersion of the index of refraction. The electro-active element may further include a second substrate having the index of refraction and the first dispersion of the index of refraction. The electro-active element may further include a cholesteric liquid crystalline material disposed between the first and said second substrates, wherein the cholesteric liquid crystalline material has an average index of refraction approximately equal to the index of refraction and a second dispersion of the average index of refraction approximately equal to the first dispersion of the index of refraction. The electro-active element may further include a continuous electrode disposed on the side of the first substrate facing the cholesteric liquid crystalline material. The electro-active element may further include one or more electrodes disposed on the side of the second substrate facing the cholesteric liquid crystalline material.

BRIEF DESCRIPTION OF THE DRAWINGS

Embodiments of the invention will be understood and appreciated more fully from the following detailed description in conjunction with the figures, which are not to scale, in which like reference numerals indicate corresponding, analogous or similar elements, and in which.

DESCRIPTION OF THE PREFERRED EMBODIMENT

Figure 1:
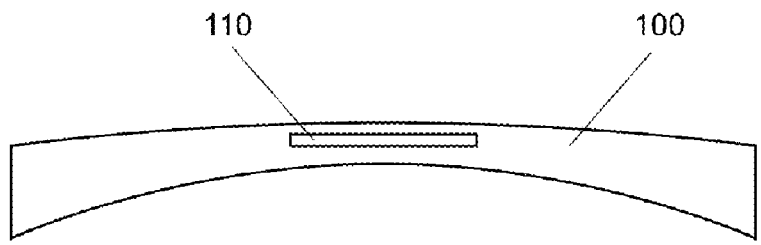
FIG. 1 shows an embodiment of the present invention in which an electro-active element is embedded within an electro-active lens.

In an embodiment of the present invention, a liquid crystalline material is polarization insensitive and has a low operating voltage requirement. In an embodiment of the present invention, the inventive liquid crystalline material may be included in an electro-active element. The inventive electro-active element may be fail-safe and may require only two electrical connections for operability. In an embodiment of the present invention, the inventive electro-active element may be included in a static electro-active lens. The static electro-active lens may at least partially correct for refractive errors of the eye such as myopia, hyperopia, astigmatism, presbyopia, and higher-order aberrations. The electro-active element may at least partially correct for any or all of the aforementioned refractive errors.

The inventive liquid crystalline material is a type of cholesteric liquid crystal. Cholesteric liquid crystalline materials, like nematic liquid crystals, are optically uniaxial and are therefore birefringent (i.e., they are characterized by $n_o$ and $n_e$ refractive index values). However, in a cholesteric liquid crystal, the director rotates in a helical manner over the thickness of the material. The helical rotation of the director is characterized by an axis of rotation, a handedness (either right or left), and a "twist pitch" p. The twist pitch is defined as the length along the axis of rotation over which the director rotates by a full 360°. Optical waves having a wavelengths comparable to the twist pitch and traveling in a direction perpendicular to the liquid crystal's director (and thus polarized in a direction parallel to the director) will experience an "average" refractive index value $n_{avg}$, where $n_{avg}=(n_o+n_e)/2$. Because the value of $n_{avg}$ is substantially constant with respect to the polarization state of the incident optical wave, the cholesteric liquid crystalline material is polarization insensitive. In the presence of an electric field applied in a direction perpendicular to the alignment layer, most of the material's directors align with the field, which effectively unwinds the director helix. As such, an optical wave traveling along the director axis of rotation will experience a continuous and polarization insensitive change in the value of the refractive index between the average value ($n_{avg}$) and the ordinary value ($n_o$). If the electric field is strong enough, the directors of the cholesteric liquid crystalline material will be substantially parallel to the applied electric field and an optical wave traveling in a direction perpendicular to the layer of cholesteric liquid crystalline material will experience a refractive index of the ordinary value ($n_o$).

If the cholesteric liquid crystalline material is in contact with an alignment layer and no electric field is applied, the director of the material at the interface between the alignment layer and the cholesteric liquid crystalline material will be in the same direction as the alignment direction. Therefore, an incoming light wave, which is traveling in a direction perpendicular to the layer of cholesteric liquid crystalline material and parallel to the axis of rotation, will experience an index of refraction comparable to $n_{avg}$, regardless of the polarization state of the incoming light wave. As the electric field is increased, the director of the material begins to point somewhere between the alignment direction and perpendicular to the alignment direction and an incoming light wave will experience a refractive index between the average value ($n_{avg}$) and the ordinary value ($n_o$) regardless of its polarization state. If the electric field is strong enough, the director of the liquid crystal molecules will be perpendicular to the alignment direction. In this case, incoming light waves, which are traveling perpendicular to the layer of cholesteric liquid crystalline material and parallel to the axis of rotation will experience the ordinary index of refraction ($n_o$) regardless of its polarization state.

FIG. 1 shows an embodiment of the present invention in which an electro-active element 110 is embedded within electro-active lens 100. The electro-active element may include a cholesteric liquid crystalline material. The electro-active lens may be formed from a conventional optical lens or from an optical substrate.

Figure 2A:
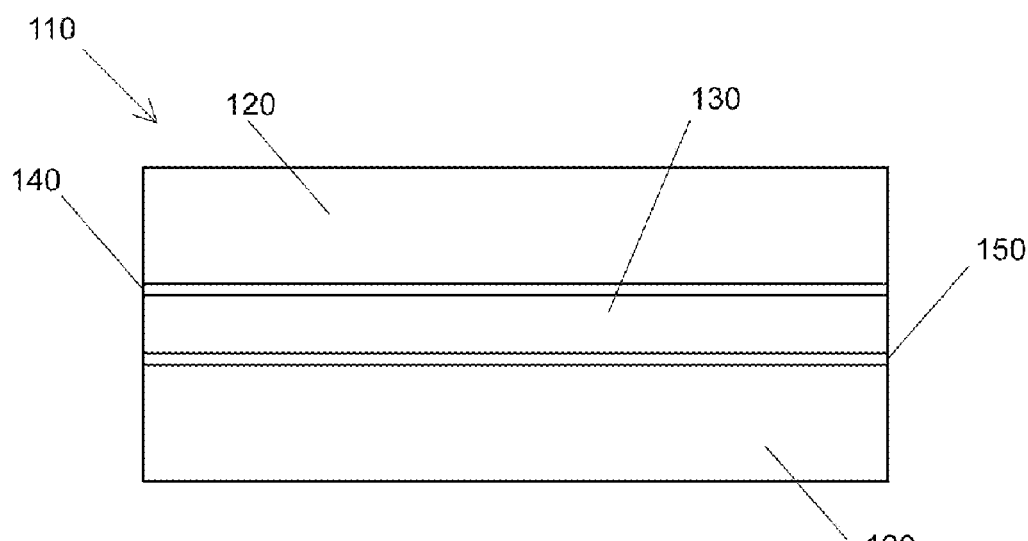
FIG. 2a shows a detailed view of embodiments of the electro-active element shown in FIG. 1 having substantially flat and parallel substrates.
Figure 2B:
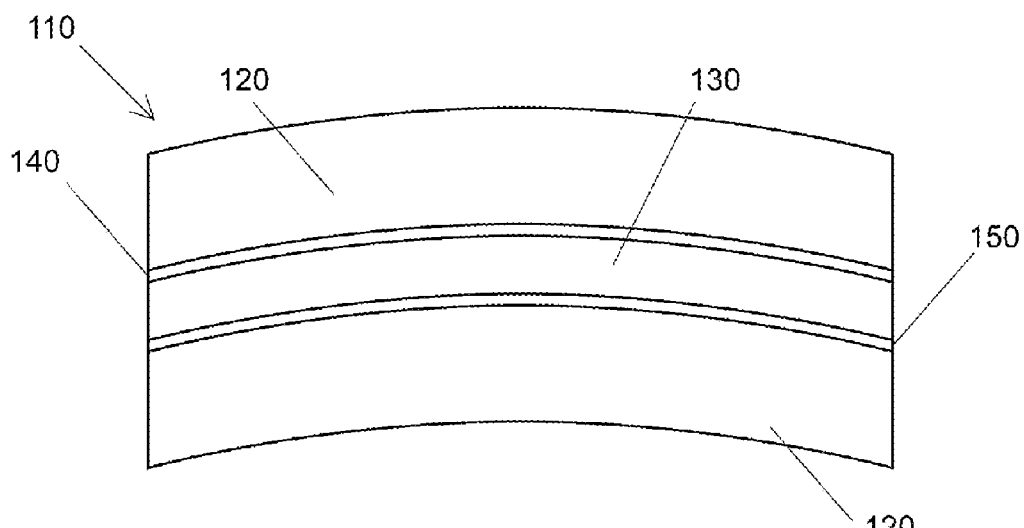
FIG. 2b shows a detailed view of embodiments of the electro-active element shown in FIG. 1 having substantially curved and parallel substrates.

FIGS. 2a-2b show a detailed view of embodiments of the electro-active element 110. The electro-active element may be constructed from two or more optically transparent substrates 120 having a cholesteric liquid crystalline material 130 therebetween. The substrates may be formed to constrain a thin layer of the cholesteric liquid crystalline material. The thickness of the layer may be, for example, less than 100 μm but is preferred to be less than 10 μm. In FIG. 2a, the substrates are shown as substantially flat and parallel while in FIG. 2b the substrates are shown as substantially curved and parallel. The substrates may be curved to match the curvature of the electro-active lens. The substrates have a known and substantially equal refractive index ($n_{sub}$). The substrates may be coated with an optically transparent electrode 140 on the side of the substrate that is in contact with the cholesteric liquid crystalline material. The optically transparent electrodes are used to apply an electric field to the liquid crystal and may, for example, comprise any of the known transparent conductive oxides (such as ITO) or a conductive organic material (such as PEDOT:PSS or carbon nano-tubes). The thickness of the optically transparent electrode layer may be, for example, less than 1 μm, but is preferred to be less than 0.1 μm. The maximum lateral dimension of the substrates may be, for example, on the order of 10 mm to 80 mm. However, the substrates may be smaller for ophthalmic applications other than spectacle lenses such as contact lenses or intraocular lenses. The substrates may have a size and configuration that allow the peripheral edge of the electro-active spectacle lens to be cut to fit within a specific spectacle lens frame (i.e., edged) while ensuring that the cholesteric liquid crystalline material remains constrained between said substrates.

In certain embodiments of the present invention, the electro-active element may be assembled from substrates physically separate from the conventional optical lens or from the optical substrate. In these embodiments, the thickness of the substrates may be, for example, greater than 100 μm but less than 1 mm, and preferably on the order of 250 µm. In other embodiments of the present invention, one of the substrates may form part of the finished spectacle lens, and thus, one substrate may be substantially thicker than the other. In these embodiments, for example, the substrate, which forms part of the finished electro-active spectacle lens, may be on the order of 1 mm to 12 mm thick. The thickness of the other substrate may greater than 100 µm but less than 1 mm, and preferably on the order of 250 µm.

Figure 3:
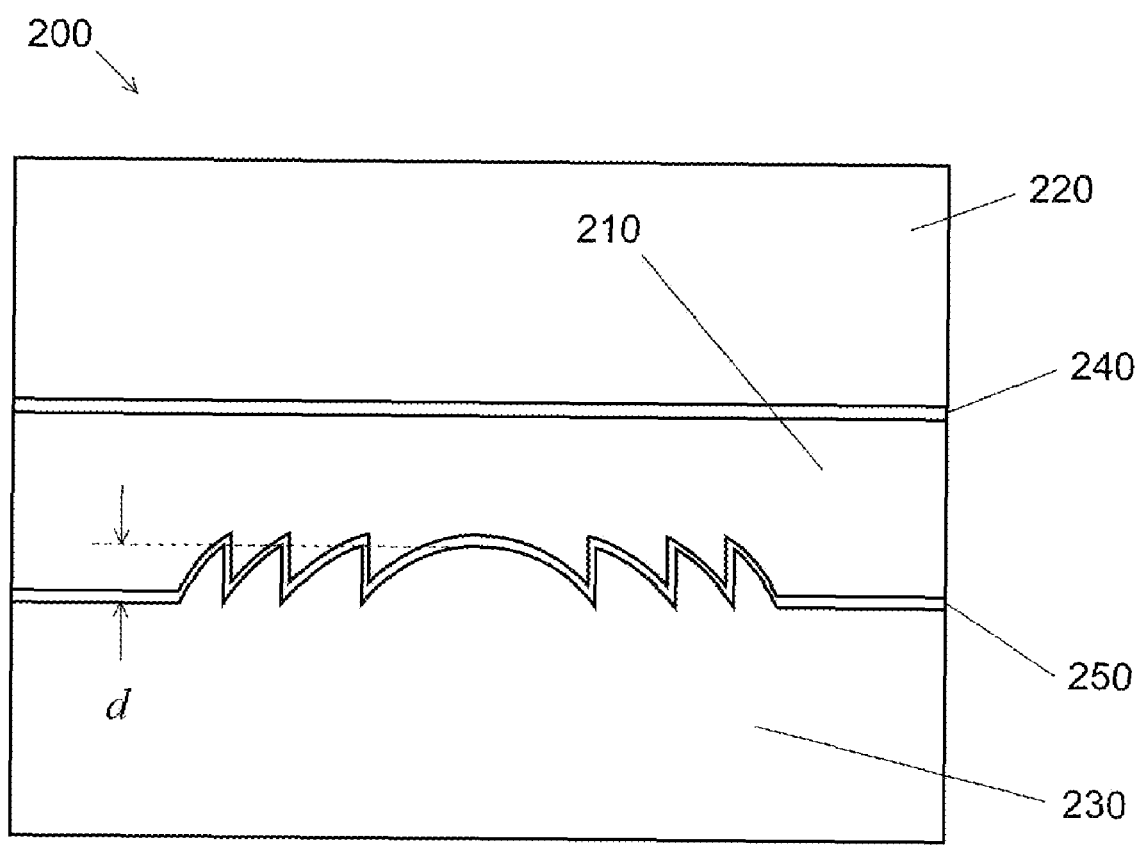
FIG. 3 shows an embodiment of the present invention in which an electro-active element includes a cholesteric liquid crystalline material located in between a first substrate with a mostly smooth surface and a second substrate with a patterned surface.

FIG. 3 shows an embodiment of the present invention in which an electro-active element 200 includes a cholesteric liquid crystalline material 210 located between a first substrate 220 with a mostly smooth surface and a second substrate 230 with a patterned surface. The surfaces of the two substrates facing the cholesteric liquid crystalline material are each coated with a single optically transparent electrode. The patterned surface of the second substrate is a surface-relief optic having a pre-determined depth d. The patterned surface may be either refractive (a surface relief refractive optic) or diffractive (a surface relief diffractive optic), but is preferred to be diffractive. The surface relief optic may be fabricated in a multitude of geometries but, in FIG. 3, is shown as a surface relief diffractive optic having an add power suitable for correcting presbyopia—namely, between +0.00 D and +3.00 D.

When a first voltage below a first predetermined threshold is applied to the electro-active element, the element may be in a deactivated state in which it provides substantially no optical power. In other words, when voltage below the first predetermined threshold is applied (or when substantially no voltage is supplied), the cholesteric liquid crystalline material may have an index of refraction ($n_{avg}$) that is substantially the same as the refractive index of the substrates ($n_{sub}$). In this case, the refractive index of the electro-active element is substantially constant over its thickness and there is no change in the optical power. When sufficient voltage is applied to align the directors of the cholesteric liquid crystalline material parallel to the resulting electric field (the voltage is above a second predetermined threshold), the electro-active element may be in an activated state in which it provides optical add power. In other words, when voltage above the second predetermined threshold is applied, the cholesteric liquid crystalline material may have an index of refraction ($n_o$) that is different than the index of refraction of the substrates. This refractive index difference (the difference between $n_o$ and $n_{sub}$) results in an optical phase delay which is generated over the thickness of the liquid crystal. This phase delay is equal to $d(n_{sub}-n_o)$. For maximum diffraction efficiency (i.e., the fraction of incident light that will be brought to focus using the diffractive element), it is necessary that all incident light of a wavelength λ interfere constructively at the focal point, where λ is the wavelength of light for which the electro-active element is designed to focus. For this to happen, the light being focused at the focal point needs to be in phase. When the phase retardation over each diffractive zone is an integer multiple of the full wavelength (λ), all the light will be in phase at the focal point and the electro-active element will have high diffraction efficiency. Thus, if $d(n_{sub}-n_o)=\lambda$, incident light of wavelength λ will be focused with high diffraction efficiency.

In embodiments of the present invention in which the electro-active element produces optical power through refraction (e.g., a surface relief refractive optic is used), first the desired optical power in the activated state is determined. Then, a radius of curvature, R, is selected to satisfy the equation $R=(n_{sub}-n_o)/$(desired optical power). A refractive optic in optical communication with a birefringent material has different indices of refraction for orthogonal polarization components of light. This results in two different focal lengths, where one of the focal lengths is the designed focal length and the other focal length is an undesired focal length. Focusing efficiency for a refractive optic may be determined as the fraction of incident light refracted to the desired focal length.

Cholesteric liquid crystalline materials are either intrinsically cholesteric (i.e., chiral or twisted), or are formed by mixing a nematic liquid crystal with a chiral twisting agent. When the latter approach is employed, the resultant cholesteric liquid crystal has many of the same properties as the nematic liquid crystal from which it is formed. For example, the resultant cholesteric liquid crystalline material will have the same dispersion of an index of refraction. The resultant cholesteric liquid crystalline material also has the same ordinary and extra-ordinary indices of refraction as the nematic liquid crystal from which it is formed (though because it is now cholesteric, the effective change in index of refraction is between $n_o$ and $n_{avg}$). In embodiments of the present invention, the latter approach is preferred since many more nematic materials are available from commercial sources than cholesteric liquid crystals—and thus, the latter approach provides more design flexibility.

Choice of a nematic liquid crystal is governed by three primary requirements. It is well known that the switching time of a liquid crystal is at least quadratic with thickness. Therefore, the first requirement is that the liquid crystal satisfies the above condition for high diffraction efficiency, $d(n_{sub}-n_o)=\lambda$, for the smallest possible value of d (Likewise, in the case of a refractive, dynamic electro-active optic, it will be required to use the largest possible radius of curvature, R, for the refractive surface to minimize the thickness at either the center or edge of the layer of liquid crystal). This demands a liquid crystal with as large a birefringence ($\Delta n=n_e-n_o$) as possible. Cholesteric liquid crystals have a reduced dynamic range with respect to their refractive indices as compared with nematic liquid crystals ($n_{avg}-n_o<n_e-n_o$). This property necessarily requires larger values of d to satisfy the condition of high diffraction efficiency. Thus, the second requirement is that the nematic liquid crystal has as large a birefringence as possible. The third requirement is that in the deactivated state the liquid crystal has a dispersion of an index of refraction (refractive index as a function of wavelength, λ) that matches a dispersion of an index of refraction of the substrates as closely as possible. Thus, the dispersion of $n_{avg}$ should match as closely as possible the dispersion of $n_{sub}$. If this is not the case, in the deactivated state, $n_{avg}$ will not be substantially equal to $n_{sub}$ over a broad range of wavelengths and there will be some unwanted focusing.

In embodiments of the present invention, the commercial nematic liquid crystal BL037 (manufactured by Merck) may be used as it has a very large birefringence ($n_e=1.8080$, $n_0=1.5260$, $\Delta n=0.2820$). Alternatively, the nematic liquid crystals BL036, BL038, BL087, BL093, BL111, TL213, TL216, E7, E63, MLC-6621-000, MLC-6621-100, ZLI-5049-000, and ZLI-5049-100, all of which are manufactured by Merck may be used. However, it should be understood that it is not possible to list all nematic liquid crystals usable in embodiments of the present invention. Therefore, in embodiments of the present invention, any nematic liquid crystal having a birefringence, $\Delta n$, larger than approximately 0.20 may be used.

To this nematic liquid crystal a chiral twisting agent is added to make it a cholesteric liquid crystalline material. Chiral dopants are qualified by the handedness they induce in the nematic liquid crystal (left or right) and by the twist strength which is quantified by the helical twisting power. The helical twisting power is defined as 100/(P*C), where P is the twist pitch (measured in microns over which the liquid crystal rotates by a full 360 degrees) induced by the chiral dopant and C is the chiral dopant's weight percentage in the mixture. It should be noted that the twist pitch is denoted as negative if it is left-handed and as positive if right-handed. Chiral agents are also available from Merck and include materials for inducing right-handed twist (CB15, ZLI-3786, ZLI-4572, MLC-6248) and left-handed twist (C15, ZLI-811, ZLI-4571, MLC-6247). Table I shows typical values of helical twisting power for the aforementioned liquid crystals. However, the values shown depend upon both the particular chiral dopant employed and the nematic liquid crystal it is mixed with and are thus typical values. It should be understood that it is not possible to list all chiral dopants usable in embodiments of the present invention. Therefore, in embodiments of the present invention, any chiral dopant having a helical twisting power with a magnitude (absolute value) greater than approximately 1.1 may be used. Alternatively, any chiral dopant having a helical twisting power with a magnitude (absolute value) greater than approximately 1.8 may be used. Alternatively, any chiral dopant having a helical twisting power with a magnitude (absolute value) greater than approximately 5.9 may be used. Alternatively, any chiral dopant having a helical twisting power with a magnitude (absolute value) greater than approximately 8.1 may be used.

TABLE I

| Chiral Dopant | Helical Twisting Power (per micron) |
|---|---|
| C15 | −1.1 to −1.8 |
| CB15 | +5.9 to +9.4 |
| ZLI-811 | −8.1 to −14.5 |
| ZLI-3786 | +8.1 to +14.5 |
| ZLI-4571 | −27.6 to −39.5 |
| ZLI-4572 | +27.6 to +39.5 |
| MLC-6247 | −8.1 to −14.5 |
| MLC-6248 | +8.1 to +14.5 |

The material ZLI-4571 may be dissolved into BL037 at increasing concentrations to induce decreasing values of the twist pitch, p, of the cholesteric liquid crystalline material. It should be noted that any of the aforementioned chiral agents may be used, but chiral agent ZLI-4571 may be preferred for embodiments of the present invention as it induces smaller values of p at lower concentrations than the other materials.

Figure 4:
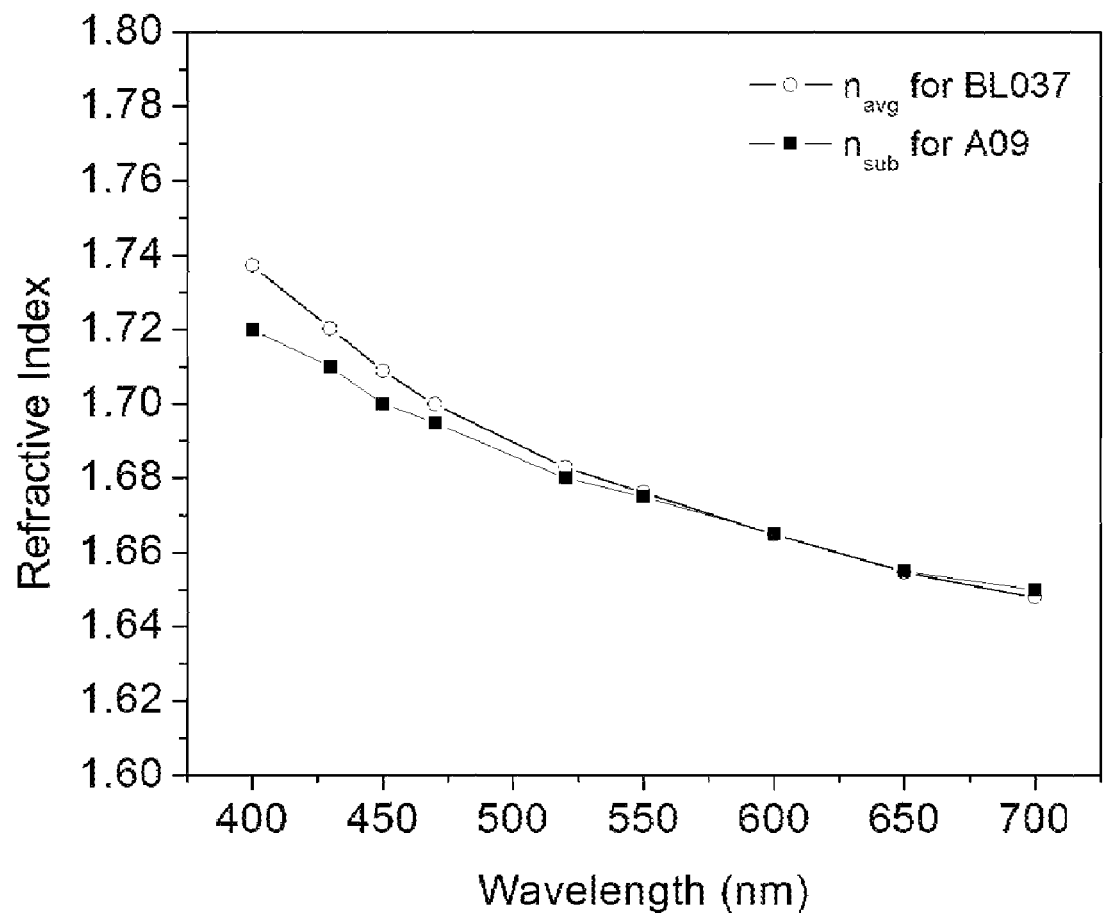
FIG. 4 shows the dispersion of an average index of refraction ($n_{avg}$) of nematic liquid crystal BL037 and substrate material A09 over the visible spectrum.

Once the cholesteric liquid crystalline material is chosen, the selection of the substrate material is dictated by the value of $n_{avg}$. For the nematic liquid crystal BL037, $n_{avg}$=1.6670. Optical materials having a refractive index that closely match this value include: A09 ($n_{sub}$=1.66, manufactured by Brewer Science), MR-10 ($n_{sub}$=1.67, manufactured by Mitsui), and Radel R-5000 NT ($n_{sub}$=1.675, manufactured by Solvay). The material A09 from Brewer science is a preferred selection as its value of $n_{sub}$ is a close match to the value of $n_{avg}$ for BL037 over a broad range of wavelengths, i.e. the dispersion of an index of refraction of the two materials is similar. FIG. 4 shows the dispersion of the average index of refraction ($n_{avg}$) of BL037 and A09 over the visible spectrum.

With the cholesteric liquid crystalline material and the substrate material chosen, the depth of the surface relief optic structures (or zone height, d) of the cholesteric liquid crystalline material must be selected. Since $n_{sub}$ and $n_o$ are now known, the zone height is chosen to satisfy the condition for high diffraction efficiency, $d(n_{sub}-n_o)=\lambda$, at the intended wavelength of operation, $\lambda$. The intended wavelength of operation is usually 550 nm, which is the wavelength of the maximum human photopic response. This step determines the activated state diffraction efficiency of the electro-active element, which should be as large as possible (preferably greater than 90%) to ensure clear vision. It should be noted that a higher diffraction efficiency may be achievable with a slightly different zone height than would be indicated by the equation $d(n_{sub}-n_o)=\lambda$. This higher diffraction efficiency may be determined experimentally by evaluating zone heights within 10% of the value determined by the aforementioned equation. By way of example only, if a surface relief diffractive optic is fabricated from the material A09 and a cholesteric liquid crystalline material made from BL037, the ideal zone height is approximately 4.0 µm.

The twist pitch of the cholesteric liquid crystalline material determines the residual deactivated state diffraction efficiency (i.e., residual focusing in the deactivated state). This value should be as low as possible, for example, less than approximately 10%, but preferably, less than approximately 5%. The diffraction efficiency or focusing efficiency of the electro-active element in the activated state and in the deactivated state is determined experimentally. The amount of chiral agent required to achieve a given twist pitch is readily determined experimentally by generating different mixtures of nematic liquid crystal with known concentrations of the chiral agent. Determining the twist pitch of a cholesteric can be accomplished by using wedged cells. The use of wedged cells is a technique well known in the art in which a layer of cholesteric liquid crystal is sandwiched between two non-parallel substrates coated with an alignment layer where the angle and distance between the substrates is known. In a wedged cell, cholesteric liquid crystal will exhibit domain discontinuities as the thickness of the cell changes. The distance between the discontinuities corresponds to the distance over which the thickness of the cell changes by a 1/4 of the twist pitch of the cholesteric liquid crystal. With a measurement of the distance between the discontinuities and the known angle between the two substrates, it is a simple matter of trigonometry to determine the twist pitch of the cholesteric liquid crystal.

Diffraction efficiency is the fraction of incident light that appears in a particular diffractive order. For an electro-active element according to embodiments of the present invention, the diffraction efficiency is the fraction of the incident light brought to focus at the designed focal length. Measuring diffraction efficiency is accomplished by passing light through the diffractive element, measuring the amount of power (in Watts, using an opto-electronic optical power meter) in each diffractive order, summing the power over all diffractive orders, and then dividing the power in the diffractive order corresponding to the designed focal length by the total power. As this measurement is conducted down-stream from the element, all transmission losses will be accounted for. This is a particularly useful method as it can be done as function of lens area, position, and wavelength; thus allowing a detailed characterization of the diffractive optic. Diffraction efficiency should generally be as high as possible (greater than 90%) in the activated state and as low as possible (less than 10%, and preferably less than 5%) in the deactivated state.

In a refractive electro-active element, index differences between orthogonal polarization components will result in two slightly different focal lengths, where one corresponds to the designed focal length and the other corresponds to an undesired focal length. In such an instance one can define a focusing efficiency, defined as the fraction of incident light refracted into the designed focal length. Measuring focusing efficiency is accomplished by passing light through the refractive element, measuring the power (in Watts, using an opto-electronic optical power meter) in each focal length individually, and then dividing the power in the designed focal length by the total power. The power may be measured in each focal length individually by using polarizers to block light from the other focal length. Focusing efficiency should generally be as high as possible (greater than 90%) in the activated state and as low as possible (less than 10%, and preferably less than 5%) in the deactivated state.

Figure 5:
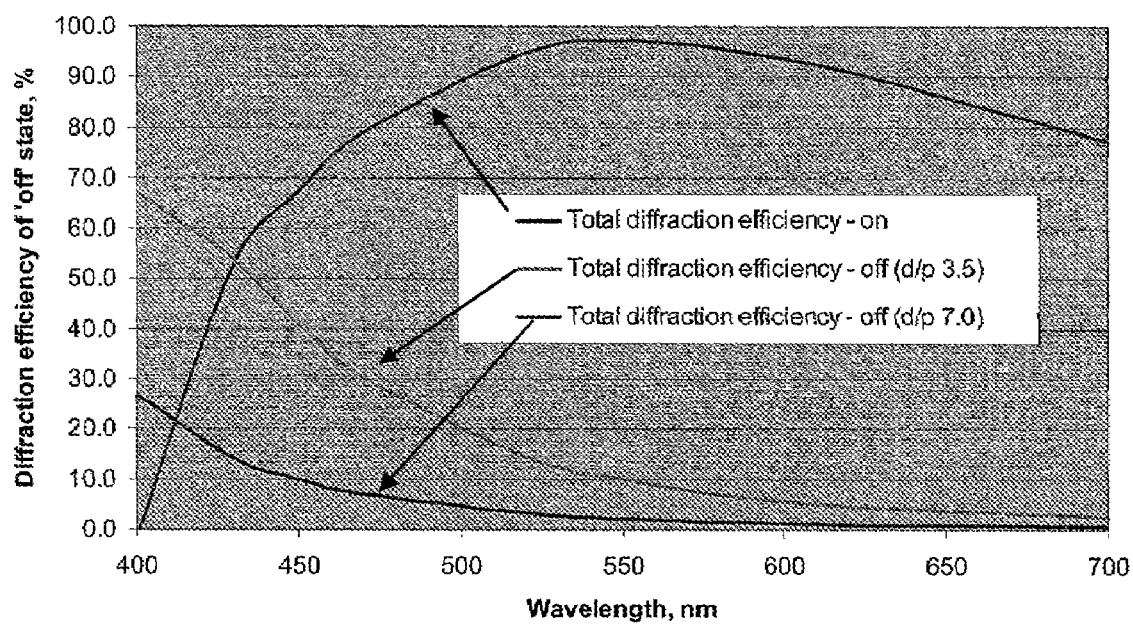
FIG. 5 shows measurements for both the activated state and deactivated state diffraction efficiency shown as a function of wavelength for an embodiment of an electro-active lens designed to operate at 550 nm.

FIG. 5 shows measurements for both the activated state and deactivated state diffraction efficiency shown as a function of wavelength for an embodiment of an electro-active lens designed to operate at 550 nm and constructed from the aforementioned materials (BL037, ZLI-4571, and A09). In FIG. 5, two curves of the deactivated state diffraction efficiency are shown for two different values of the d/p ratio, the ratio of the zone height to the cholesteric liquid crystalline material twist pitch. The d/p ratio is a useful metric for diffraction efficiency in the deactivated state. As can be seen, the activated state diffraction efficiency is nearly 100% at the design wavelength, 550 nm. However, the deactivated state diffraction efficiency decreases for larger values of the d/p ratio. The diffraction efficiency is 9.9% for a d/p ratio of 3.5 and 2.3% for a d/p of 7.0. It has also been found that the residual deactivated state diffraction efficiency is reduced when the value of $n_{sub}$ falls within the range of approximately $n_{avg}$ to approximately $n_{avg}+0.02$.

In the example lens constructed from BL037, ZLI-4571, and A09 described above, if a d/p ratio of 7 is desired, the required twist pitch is approximately 0.53 μm. It has been shown experimentally that a twist pitch of approximately 0.5 μm can be achieved if 6% of the chiral agent ZLI-4571 by weight is mixed with the nematic liquid crystal BL037. For example, in some embodiments of the present invention, 2% of the chiral agent ZLI-4571 by weight is mixed with the nematic liquid crystal BL037. The cholesteric liquid crystalline material of this embodiment has a twist pitch between approximately 0.7 μm and approximately 0.8 μm, but has a low enough diffraction efficiency and a low operating voltage. In other embodiments, the twist pitch of the cholesteric liquid crystalline material may be approximately 0.10 μm or greater. Alternatively, in certain embodiments of the present invention approximately 10% or less of the chiral agent ZLI-4571 by weight is mixed with the nematic liquid crystal BL037. Although a smaller twist pitch (higher d/p ratio) typically results in lower diffraction efficiency in the deactivated state, it also typically results in higher operating voltages for the electro-active element. Thus, low diffraction efficiency in the deactivated state must often be weighed against operating voltage requirements.

As mentioned above, the cholesteric liquid crystalline material may be produced from a nematic liquid crystal and a chiral doping agent. The mass of a given amount of nematic liquid crystal is measured and the appropriate mass of chiral dopant is determined based on the mass of liquid crystal and the desired percentage by weight of the chiral dopant. In other words, if 6% of the chiral agent is desired, 94 grams of nematic liquid crystal may be combined with 6 grams of the chiral doping agent. The desired mass of chiral dopant may be added to the liquid crystal and mixed physically by a mixing machine or by adding a magnetic stir bar and placing the mixture on a magnetic stir plate.

Figure 6:
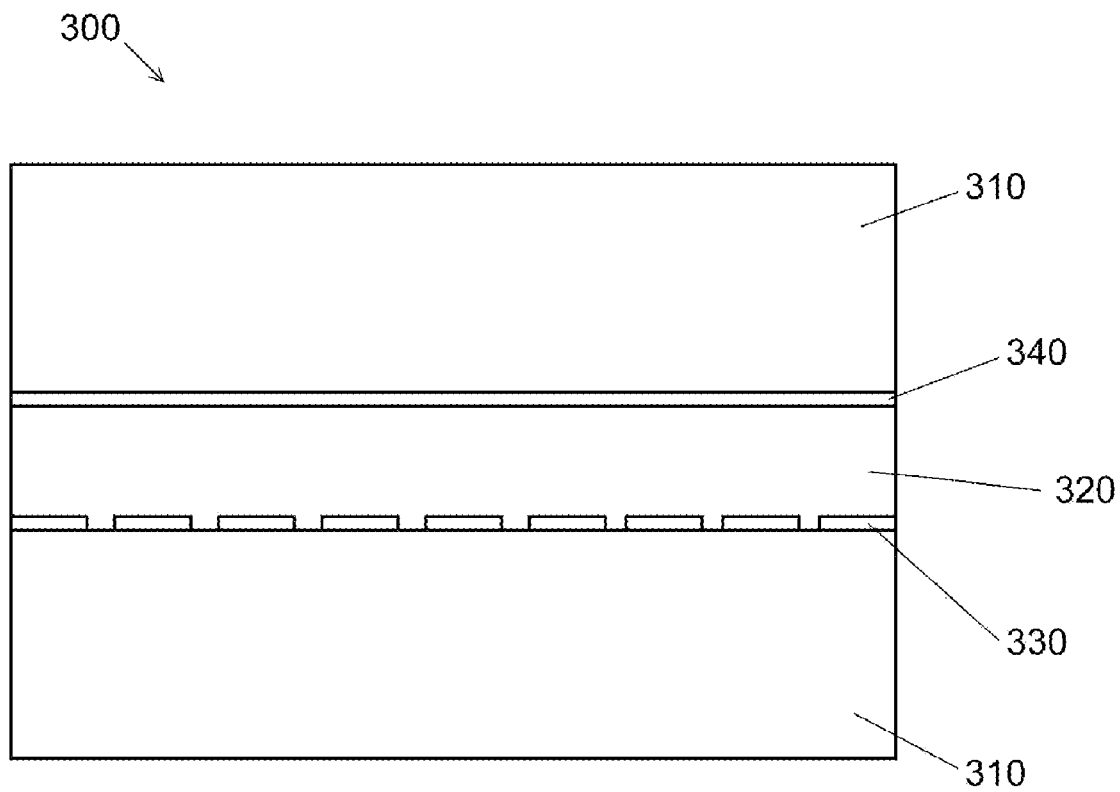
FIG. 6 shows an embodiment of an electro-active element including two substrates disposed such that there is a substantially constant thickness between them—the first substrate has a single continuous electrode disposed thereon and the second substrate has a plurality of electrodes disposed thereon.

In another embodiment of the invention shown in FIG. 6, an electro-active element 300 includes two substrates 310 which are disposed such that there is a substantially constant thickness between them. A cholesteric liquid crystalline material 320 may be disposed between the substrates. It should be noted that no surface-relief optic is included in such an embodiment. In the absence of a surface-relief optic, patterned or pixilated electrodes 330 are used in conjunction with another single electrode 340. A plurality of voltages of different amplitudes may be applied to the patterned or pixilated electrodes. These electrodes may be arranged in a manner such that when voltages are applied to the electrodes, the resulting polarization-insensitive refractive index profile in the layer of cholesteric liquid crystalline material acts to focus light in a diffractive or refractive manner.

Patterned Electrodes are electrodes utilized in an electro-active element such that with the application of appropriate voltages to the electrodes, the optical power created by the liquid crystal is created diffractively regardless of the size, shape, and arrangement of the electrodes. For example, a diffractive optical effect can be dynamically produced within the liquid crystal by using concentric ring shaped electrodes. Pixilated Electrodes are electrodes utilized in an electro-active element that are individually addressable regardless of the size, shape, and arrangement of the electrodes. Furthermore, because the electrodes are individually addressable, any arbitrary pattern of voltages may be applied to the electrodes. For example, pixilated electrodes may be squares or rectangles arranged in a Cartesian array or hexagons arranged in a hexagonal array. Pixilated electrodes need not be regular shapes that fit to a grid. For example, pixilated electrodes may be concentric rings if every ring is individually addressable. Concentric pixilated electrodes can be individually addressed to create a diffractive optical effect.

In embodiments of the present invention, an electro-active element may be implanted (by either molding or casting, for example) within a refractive spectacle lens or an optical substrate to form an electro-active lens. The spectacle lens or the optical substrate may have substantially the same refractive index as the electro-active element's substrates to ensure that the edges of the electro-active element are invisible in the finished electro-active lens. In embodiments in which the electro-active element substrates are manufactured from A09 ($n_{sub}$=1.66, manufactured by Brewer Science), the commercially available ophthalmic lens resin MR-10 (n=1.67, manufactured by Mitsui) would be an appropriate selection. Alternatively, other materials may be used. If desired, the dispersion of an index of refraction of the refractive spectacle lens or optical substrate may be matched to the dispersion of an index of refraction of the electro-active element's substrates.

In embodiments of the present invention, the electro-active element may be miniaturized and utilized within an electro-active contact lens, an electro-active corneal in-lay, an electro-active corneal on-lay, or an electro-active intra-ocular lens. The electro-active element may also be combined with a Progressive Addition Lens or any other multifocal lens such as a bifocal or trifocal. The electro-active element may also be combined with a single-vision lens.

Embodiments of the present invention have shown selecting materials for a diffractive electro-active element and selecting the properties of these materials in the following order:

1) Select a nematic liquid crystal having a high birefringence.
2) Select a chiral twisting agent based on the concentration required to induce a smaller value of p.
3) Select an electro-active substrate material having an index of refraction ($n_{sub}$) that matches the average index of refraction ($n_{avg}$) of the nematic liquid crystal over a broad range of wavelengths (i.e., the dispersion of an index of refraction of the two materials is substantially equal).
4) Select an operative wavelength, $\lambda$.
5) Select a zone height, d, based on satisfying $d(n_{sub}-n_o)=\lambda$.
6) Determine experimentally the percentage by weight of chiral doping agent to add to the nematic liquid crystal to achieve the desired p which produces low diffraction efficiency in the deactivated state and low operating voltage.

Embodiments of the present invention have shown selecting materials for a refractive electro-active element and selecting the properties of these materials in the following order:
1) Select a nematic liquid crystal having a high birefringence.
2) Select a chiral twisting agent based on the concentration required to induce a smaller value of p.
3) Select an electro-active substrate material having an index of refraction ($n_{sub}$) that matches the average index of refraction ($n_{avg}$) of the nematic liquid crystal over a broad range of wavelengths (i.e., the dispersion of an index of refraction of the two materials is substantially equal).
4) Select an operative wavelength, $\lambda$.
5) Select a radius of curvature, R, based on satisfying $R=(n_{sub}-n_o)/(desired\ optical\ power)$.
6) Determine experimentally the percentage by weight of chiral doping agent to add to the nematic liquid crystal to achieve the desired p which produces low focusing efficiency in the deactivated state and low operating voltage.

It is to be understood, that these steps may be performed out of order. For example, a nematic liquid crystal is selected before the substrate because many more substrate materials are commercially available. Thus, it is easier to find a substrate material with index of refraction and dispersion of the index of refraction properties that match a given nematic liquid crystal than it is to find a nematic liquid crystal with index of refraction and dispersion of the index of refraction properties that match a given substrate material. However, if desired, the substrate material may be selected before the nematic liquid crystal.

Embodiments of the present invention satisfy all four requirements listed above. Namely, the electro-active element is fail-safe as it provides substantially no optical power in the deactivated state because it has low diffraction efficiency or focusing efficiency in the deactivated state. Additionally, the electro-active element includes a cholesteric liquid crystalline material which is polarization insensitive and can thus focus all incident light. The electro-active lens only requires approximately 5 volts to operate in the activated state (in certain embodiments no more than between approximately 10 volts to approximately 15 volts are required, but in no case is more than 20 volts are required) and thus has low electrical power requirements (typically less than 1 milliwatt). Lastly, only two electrical connections are needed in some embodiments of the electro-active lens which have two continuous electrodes such as the embodiments shown in FIGS. 2a, 2b, and 3.

What is claimed is:

1. An electro-active lens, comprising:
a single layer of an electro-active material, wherein the electro-active lens has an optical power in an activated state, and wherein the electro-active lens has substantially no optical power in a deactivated state,
the electro-active lens, further comprising:
a first substrate having a first index of refraction; and
a second substrate having said first index of refraction, wherein said electro-active material is disposed between said first and said second substrates, and wherein said electro-active material has a second index of refraction approximately equal to said first index of refraction when the electro-active lens is in said deactivated state;
wherein said first substrate is a surface relief diffractive element; and
wherein the electro-active lens has a diffraction efficiency in said deactivated state of less than approximately 10%.

2. The electro-active lens of claim 1, wherein the electro-active lens has a diffraction efficiency in said deactivated state of less than approximately 5%.

3. The electro-active lens of claim 1, further comprising:
a continuous electrode disposed on the side of said first substrate facing said electro-active material; and
one or more electrodes disposed on the side of said second substrate facing said electro-active material.

4. The electro-active lens of claim 3, wherein said one or more electrodes are patterned.

5. The electro-active lens of claim 3, wherein said one or more electrodes are pixilated.

6. The electro-active lens of claim 1, further comprising a base lens, wherein said base lens is selected from the group consisting of: a finished lens blank, a semi-finished lens blank, an unfinished lens blank, a single focus lens, and a multifocal lens.

7. An electro-active lens, comprising:
a single layer of an electro-active material, wherein the electro-active lens has an optical power in an activated state, and wherein the electro-active lens has substantially no optical power in a deactivated state,
the electro-active lens, further comprising:
a first substrate having a first index of refraction; and
a second substrate having said first index of refraction, wherein said electro-active material is disposed between said first and said second substrates, and wherein said electro-active material has a second index of refraction approximately equal to said first index of refraction when the electro-active lens is in said deactivated state;
wherein said first substrate is a surface relief diffractive element; and
wherein the electro-active lens has a diffraction efficiency in said activated state of greater than approximately 90%.

8. An electro-active lens, comprising:
a single layer of an electro-active material, wherein the electro-active lens has an optical power in an activated state, and wherein the electro-active lens has substantially no optical power in a deactivated state;
wherein said electro-active material is a cholesteric liquid crystalline material;
wherein said cholesteric liquid crystalline material is comprised of a nematic liquid crystal and a chiral doping agent; and
wherein said nematic liquid crystal has a birefringence of approximately 0.20 or higher, and wherein said chiral doping agent has a helical twisting power with a magnitude of approximately 1.1 or higher.

9. The electro-active lens of claim 8, wherein said nematic liquid crystal is selected from the group consisting of: BL036, BL037, BL038, BL087, BL093, BL111, TL213, TL216, E7, E63, MLC-6621-000, MLC-6621-100, ZLI-5049-000, and ZLI-5049-100.

10. The electro-active lens of claim 8, wherein said chiral doping agent is selected from the group consisting of: C15, CB15, ZLI-811, ZLI-3786, ZLI-4571, ZLI-4572, MLC-6247, and MLC-6248.

11. An electro-active lens, comprising:
a single layer of an electro-active material, wherein the electro-active lens has an optical power in an activated state, and wherein the electro-active lens has substantially no optical power in a deactivated state;
wherein said electro-active material is a cholesteric liquid crystalline material;
wherein said cholesteric liquid crystalline material is comprised of a nematic liquid crystal and a chiral doping agent; and
wherein the cholesteric liquid crystalline material has approximately 10% ZLI-4571 or less by weight.

12. An electro-active lens, comprising:
a single layer of an electro-active material, wherein the electro-active lens has an optical power in an activated state, and wherein the electro-active lens has substantially no optical power in a deactivated state;
wherein said electro-active material is a cholesteric liquid crystalline material;
wherein said cholesteric liquid crystalline material is comprised of a nematic liquid crystal and a chiral doping agent; and
wherein the cholesteric liquid crystalline material has a twist pitch of approximately 0.10 µm or greater.

13. An electro-active lens, comprising:
a single layer of an electro-active material, wherein the electro-active lens has an optical power in an activated state, and wherein the electro-active lens has substantially no optical power in a deactivated state,
the electro-active lens, further comprising:
a first substrate having a first index of refraction; and
a second substrate having said first index of refraction, wherein said electro-active material is disposed between said first and said second substrates, and wherein said electro-active material has a second index of refraction approximately equal to said first index of refraction when the electro-active lens is in said deactivated state; and
wherein said first substrate and said second substrate have a first dispersion of said first index of refraction, and wherein said electro-active material has a second dispersion of said second index of refraction, and wherein first dispersion of said first index of refraction is substantially equal to second dispersion of said second index of refraction.

14. A cholesteric liquid crystalline material, comprising:
a nematic liquid crystal having a birefringence of approximately 0.20 or higher; and
a chiral doping agent having a helical twisting power with a magnitude of approximately 1.1 or higher.

15. The cholesteric liquid crystalline material of claim 14, wherein said nematic liquid crystal is selected from the group consisting of: BL036, BL037, BL038, BL087, BL093, BL111, TL213, TL216, E7, E63, MLC-6621-000, MLC-6621-100, ZLI-5049-000, and ZLI-5049100.

16. The cholesteric liquid crystalline material of claim 14, wherein said chiral doping agent is selected from the group consisting of: C15, CB15, ZLI-811, ZLI-3786, ZLI-4571, ZLI4572, MLC-6247, and MLC-6248.

17. The cholesteric liquid crystalline material of claim 14, wherein the cholesteric liquid crystalline material has approximately 10% ZLI-4571 or less by weight.

18. The cholesteric liquid crystalline material of claim 14, wherein the cholesteric liquid crystalline material has a twist pitch of approximately 0.10 µm or greater.

19. An electro-active element, comprising:
a first substrate having an index of refraction and a first dispersion of said index of refraction;
a second substrate having said index of refraction and said first dispersion of said index of refraction;
a cholesteric liquid crystalline material disposed between said first and said second substrates, wherein said cholesteric liquid crystalline material has an average index of refraction approximately equal to said index of refraction and a second dispersion of said average index of refraction approximately equal to said first dispersion of said index of refraction;
a continuous electrode disposed on the side of said first substrate facing said cholesteric liquid crystalline material; and
one or more electrodes disposed on the side of said second substrate facing said cholesteric liquid crystalline material.

20. The electro-active element of claim 19, wherein said cholesteric liquid crystalline material is comprised of a nematic liquid crystal and a chiral doping agent.

21. The electro-active element of claim 20, wherein said nematic liquid crystal has a birefringence of approximately 0.20 or higher, and wherein said chiral doping agent has a helical twisting power with a magnitude of approximately 1.1 or higher.

22. The electro-active element of claim 20, wherein said nematic liquid crystal is selected from the group consisting of: BL036, BL037, BL038, BL087, BL093, BL111, TL213, TL216, E7, E63, MLC-6621-000, MLC-6621-100, ZLI-5049-000, and ZLI-5049-100.

23. The electro-active element of claim 20, wherein said chiral doping agent is selected from the group consisting of: C15, CBI5, ZLI-811, ZLI-3786, ZLI-4571, ZLI-4572, MLC-6247, and MLC-6248.

24. The electro-active element of claim 20, wherein the cholesteric liquid crystalline material has approximately 10% ZLI-4571 or less by weight.

25. The electro-active element of claim 20, wherein the cholesteric liquid crystalline material has a twist pitch of approximately 0.10 µm or greater.

26. The electro-active element of claim 19, wherein said first substrate is a surface relief optic.

27. The electro-active element of claim 26, wherein said first substrate is a surface relief refractive optic.

28. The electro-active element of claim 26, wherein said first substrate is a surface relief diffractive optic having a zone height.

29. The electro-active element of claim 28, wherein said zone height is approximately equal to an operative wavelength of the electro-active element divided by the difference of said index of refraction and an ordinary index of refraction of said cholesteric liquid crystalline material.

30. The electro-active element of claim 28, wherein the electro-active element has a diffraction efficiency in a deactivated state of less than approximately 10%.

31. The electro-active element of claim 30, wherein the electro-active element has a diffraction efficiency in a deactivated state of less than approximately 5%.

32. The electro-active element of claim 19, wherein said one or more electrodes are patterned.

33. The electro-active element of claim 19, wherein said one or more electrodes are pixilated.

34. The electro-active element of claim 19, wherein the electro-active element has a diffraction efficiency in an activated state of greater than approximately 90%.

35. An electro-active lens, comprising:

a base lens; and an electro-active lens in optical communication with said base lens, comprising a first substrate having an index of refraction and a first dispersion of said index of refraction;

a second substrate having said index of refraction and said first dispersion of said index of refraction;

a cholesteric liquid crystalline material disposed between said first and said second substrates, wherein said cholesteric liquid crystalline material has an average index of refraction approximately equal to said index of refraction and a second dispersion of said average index of refraction approximately equal to said first dispersion of said index of refraction;

a continuous electrode disposed on the side of said first substrate facing said cholesteric liquid crystalline material; and one or more electrodes disposed on the side of said second substrate facing said cholesteric liquid crystalline material.

36. The electro-active lens of claim 35, wherein said cholesteric liquid crystalline material is comprised of a nematic liquid crystal and a chiral doping agent.

37. The electro-active lens of claim 36, wherein said nematic liquid crystal has a birefringence of approximately 0.20 or higher, and wherein said chiral doping agent has a helical twisting power with a magnitude of approximately 1.1 or higher.

38. The electro-active lens of claim 36, wherein said nematic liquid crystal is selected from the group consisting of: BL036, BL037, BL038, BL087, BL093, BL111, TL213, TL216, E7, E63, MLC-6621-000, MLC-6621-100, ZLI-5049-000, and ZLI-5049-100.

39. The electro-active lens of claim 36, wherein said chiral doping agent is selected from the group consisting of: C15, CB15, ZLI-811, ZLI-3786, ZLI-4571, ZLI-4572, MLC-6247, and MLC-6248.

40. The electro-active lens of claim 36, wherein the cholesteric liquid crystalline material has approximately 10% ZLI-4571 or less by weight.

41. The electro-active lens of claim 36, wherein the cholesteric liquid crystalline material has a twist pitch of approximately 0.10 µm or greater.

42. The electro-active lens of claim 35, wherein said first substrate is a surface relief optic.

43. The electro-active lens of claim 42, wherein said first substrate is a surface relief refractive optic.

44. The electro-active lens of claim 42, wherein said first substrate is a surface relief diffractive optic having a zone height.

45. The electro-active lens of claim 44, wherein said zone height is approximately equal to an operative wavelength of the electro-active element divided by the difference of said index of refraction and an ordinary index of refraction of said cholesteric liquid crystalline material.

46. The electro-active lens of claim 44, wherein the electro-active element has a diffraction efficiency in a deactivated state of less than approximately 10%.

47. The electro-active lens of claim 46, wherein the electro-active element has a diffraction efficiency in a deactivated state of less than approximately 5%.

48. The electro-active lens of claim 35, wherein said one or more electrodes are patterned.

49. The electro-active lens of claim 35, wherein said one or more electrodes are pixilated.

50. The electro-active lens of claim 35, wherein the electro-active element has a diffraction efficiency in an activated state of greater than approximately 90%.

51. The electro-active lens of claim 35, wherein said base lens is selected from the group consisting of: a finished lens blank, a semi-finished lens blank, an unfinished lens blank, a single focus lens, and a multifocal lens.

* * * * *